April 10, 1956  A. P. BRUNDAGE  2,741,054
NIGHT SIGNAL FOR ICE FISHING GEAR
Filed June 12, 1951
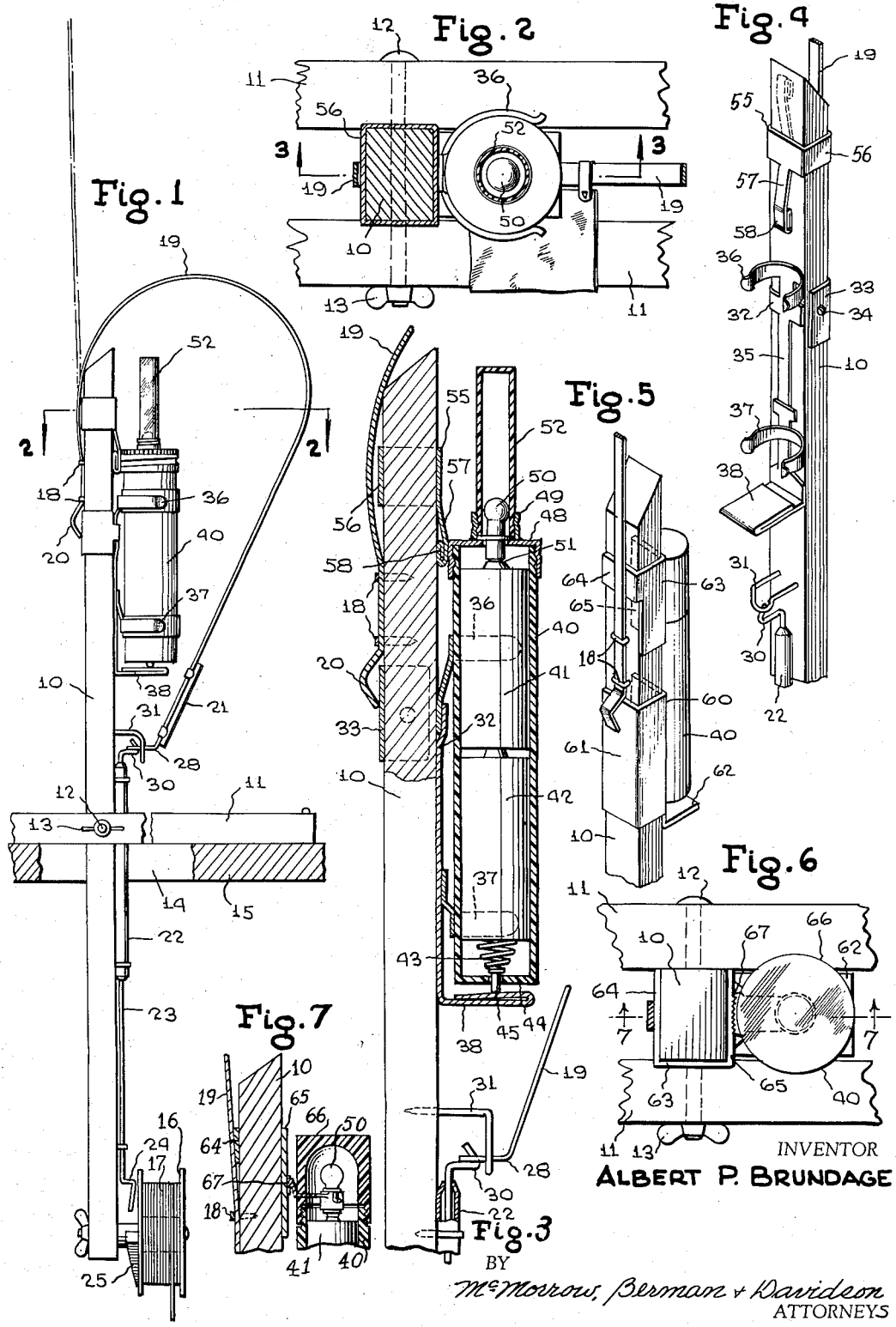
INVENTOR
ALBERT P. BRUNDAGE
BY
McMorrow, Berman & Davidson
ATTORNEYS though the night signal attachment has been described

United States Patent Office 2,741,054
Patented Apr. 10, 1956

2,741,054

NIGHT SIGNAL FOR ICE FISHING GEAR

Albert P. Brundage, Walden, N. Y.; Isabel D. Brundage, administratrix of said Albert P. Brundage, deceased Application June 12, 1951, Serial No. 231,173

1 Claim. (Cl. 43—17)

It is among the objects of the invention to provide a luminous signal on apparatus for fishing through ice and more particularly an electric light signal provided as an attachment which can be installed or removed, as desired.

It is among the objects of the invention to provide an improved light signal for ice fishing gear to provide fish strike signals visible at night; which light signal is provided as an attachment which can be removed from the fishing gear for daytime fishing, if desired; which is actuated by the tip-up signal of the fishing gear when the tip-up signal is released by a fish strike; which is of small size and light weight and does not interfere in any way with the operation of the ice fishing apparatus on which it is installed; which can be rendered operative or inoperative as desired; and which is simple and durable in construction, economical to manufacture, easy to install, and positive and effective in operation.

Other objects and advantages will become apparent from a consideration of the following description and the appended claim in conjunction with the accompanying drawing wherein:

Figure 1 is a side elevational view of an ice fishing device with a night signalling attachment illustrative of the invention operatively mounted thereon;

Figure 2 is a transverse cross sectional view on the line 2—2 of Figure 1;

Figure 3 is a partial longitudinal cross sectional view on the line 3—3 of Figure 2;

Figure 4 is a perspective view of a portion of the ice fishing device showing the manner of mounting the signal light attachment thereon;

Figure 5 is a perspective view of a fragmentary portion of the ice fishing device showing a modified form of signal light attachment mounted thereon;

Figure 6 is a top plan view of the mechanism illustrated in Figure 5; and

Figure 7 is a fragmentary cross sectional view on the line 7—7 of Figure 6.

With continued reference to the drawing, the ice fishing apparatus comprises an elongated shaft 10, preferably made of hard wood and of a rectangular cross sectional shape. A yoke 11 is pivotally connected to the shaft 10 substantially at the mid-length location of the shaft and substantially at the mid-length location of the yoke by a pivot bolt 12 extending through registering apertures in the shaft and the yoke and carrying a wing nut 13 for clamping the yoke in selected positions of angular adjustment relative to the shaft. The yoke 11 can be disposed longitudinally of the shaft for convenience in transportation or storage, and can be secured in a position substantially perpendicular to the shaft for supporting the shaft in a substantially vertical position projecting through a fishing hole 14 in an ice layer 15 on a body of water with the lower portion of the shaft submerged in the water below the ice, the upper portion of the shaft extending upwardly from the surface of the ice, and with the ends of the yoke resting upon the ice at opposite sides of the fishing hole. A line reel 16 is pivotally mounted on the shaft 10 at the lower end of the shaft and carries a fishing line 17 wound thereon, the line being provided with the usual fishing hook on the free end thereof.

A pair of staples 18 are secured in the shaft near the upper end of the shaft and are spaced apart longitudinally of the shaft to provide a guideway slidably receiving an elongated flat spring 19 providing a tip-up signal for the device. The spring is slidable through the staples 18 from a position in which it lies along the corresponding side of the shaft for convenience in transportation and storage of the device, to a position in which it extends longitudinally beyond the upper end of the shaft. At one end the spring is provided with an offset portion 20 to prevent pulling the spring entirely through the guideway staples 18 and a small signal flag 21 is carried by the spring near the other end thereof.

A tube 22 is secured to the shaft 10 at the side of the shaft opposite the staples 18 and extends longitudinally of the shaft to opposite sides of the location of the pivot bolt 12 and a trigger rod 23 is rotatably mounted in the tube 22 and has at its lower end an offset portion 24 positioned adjacent the reel 16. The reel is provided on its end adjacent the shaft 10 with a cam 25 which strikes the offset portion 24 of the trigger rod when the reel is rotated by the pull of a fish on the fishing line 17 to rotate the trigger rod in the tube 22. The end of the spring 19 remote from offset portion 20 is provided with an angularly disposed portion 28 having an aperture therein and at its upper end the trigger rod 23 is provided with a hook 30 engageable in the aperture in the angularly disposed end portion 28 of the spring to releasably hold the spring in a bowed condition, as illustrated in Figure 1, with the end of the spring remote from the offset portion 20 near the upper end of the tube 22 and also near the yoke 11. A staple 31 having a right angle bend intemediate its length is secured to the shaft 10 and extends around the hook 30 of the trigger rod to provide a guide for this hook and the angularly disposed end portion 28 of the spring when the spring is connected to the hook.

With this arrangement, with the spring engaged by the hook 30 when the trigger rod 23 is moved by the cam 25 on the reel, the corresponding end of the spring is released and the spring tips up to a position at which it extends upwardly from the upper end of the shaft 10, as indicated in broken lines in Figure 1, raising the flag to a position elevated above the upper end of the rod and thereby providing a visual signal indicating that the hook on the fishing line has been taken by a fish.

The ice fishing apparatus so far described is of known construction and does not constitute a part of the present invention except in the combination thereof with the novel light signal means presently to be described.

The light signal attachment of the present invention comprises a bracket 32 having at one end a loop portion 33 surrounding the shaft 10 near the upper end of the latter and firmly secured to the shaft by suitable means, such as the brads 34. The bracket also includes a strap portion 35 which extends downwardly from the loop portion 33 longitudinally of the side of the shaft 10 remote from the staples 18, two C-shaped clips 36 and 37 extending from the strap portion 35, one at the upper end and one near the lower end of the strap portion and in a direction away from the adjacent side of the shaft 10 and a platform 38 extend perpendicularly from the lower end of the strap in a direction away from the adjacent face of the shaft.

A cylindrical housing 40 of electrically insulative material is engaged in the clips 36 and 37 and is of a size to receive two medium sized commercial flashlight batteries, as indicated at 41 and 42 in Figure 3. The batteries are disposed in end to end relationship and a coiled spring 43 is disposed between the end of the battery 42 and the bottom end wall 44 of the housing to resiliently support the batteries in the housing. A contact pin 45 is secured at one end to the spring 43 at the end of the spring adjacent the bottom end wall of the housing and projects through an aperture in the bottom end wall 44 to make an electrically conductive contact with the platform 38 of the bracket.

A screw cap 48 of electrically conductive material is threaded onto the upper end of the housing 40 and is provided with a centrally located aperture and a screw threaded boss 49 surrounding the aperture at the side of the screw cap remote from the housing. A light bulb 50 is mounted in the central aperture in the cap 48 and may comprise either a unitary bulb and socket structure or a socket secured in the cap and a bulb threaded into the socket in the manner well known to the art. The center contact 51 of the bulb is in electrically conductive engagement with the end contact of the upper battery 41 and the side contact of the bulb is in electrically conductive contact with the screw cap 48 which is insulated from the batteries by the housing 40 of electrically insulative material.

A protective globe 52 is threaded at one end into the boss 49 and encloses the light bulb 50 to protect the light bulb from accidental damage. This globe is made of a suitable transparent material and may be colored, if desired.

A conductor 55 includes a loop portion 56 which surrounds the shaft 10 near the upper end of the shaft and is slidably mounted thereon, and a tongue 57 extending from one end of the loop portion along the shaft. When the conductor is mounted on the shaft in the position illustrated in Figures 1 and 2, the folded over end portion 58 of the tongue remote from the loop portion 56 is disposed between the shaft 10 and the screw cap 48 and makes an electrically conductive contact with the screw cap and the loop portion 56 surrounds the shaft between the staples 18 and the upper end of the shaft. When the spring 19 is pulled out to extend beyond the upper end of the shaft 10 the offset portion 20 at one end of the spring engages and makes an electrically conductive contact with the loop portion 33 of the bracket 32 which carries the housing or battery case 40. When this spring is held in its bowed condition by engagement of its free end with the hook 30 on the upper end of the trigger rod 23, the spring is held out of contact with the loop portion 56 of the conductor 55, as is clearly illustrated in Figure 3. However, when the spring is released from the trigger hook 30 and springs up to its straight position, as illustrated in Figure 5, it engages and makes an electrically conductive contact with the adjacent side of the loop portion 56 of the conductor, thereby completing an energizing circuit for the light bulb 50 from the lower end of the battery 42 through the spring 43 and contact pin 45 to the bracket platform 38, through the bracket to the end formation 20 of the spring, through the spring to the conductor 55, through the conductor 55 and the screw cap 48 to one side or contact of the light bulb and through the light bulb and its other side or contact to the battery 41, the lower end of which is in electrically conductive contact with the upper end of the battery 42.

When the spring first snaps up to its upright position its upper end swings back and forth for a period of time causing it to alternately make and break contact with the conductor 55. This gives a flashing operation of the light bulb 50 immediately after the hook has been taken by a fish, this flashing operation gradually slowing down and finally becoming steady as the movement of the upper end of the spring diminishes, thus giving the fisherman an indication of the time elapsed since the strike.

In the modified arrangement illustrated in Figures 5 and 6 the bracket 60 includes a clamp 61 of a shape and of a size to closely receive the shaft 10. This clamp has one side open, so that it can be slipped onto and off of the shaft from one side of the shaft, and has a platform 62 projecting from its lower end substantially perpendicular to the clamp 61. In this case, the battery casing or housing 40 is permanently secured to the bracket 60 at the side of the clamp portion 61 from which the platform 62 projects, so that the housing together with the associated batteries and light bulb constitute a unitary assembly with the bracket 61 which can be mounted upon and removed from the shaft 10, as desired.

The conductor 63, in this case, includes a clamp portion 64 having one side open and closely receiving the shaft 10 near the upper end of the shaft. This conductor also has a portion 65 extending downwardly along the side of the shaft on which the battery housing 40 is mounted and the battery screw cap 66 is provided on one side with a contact extension 67 which is brought into electrically conductive contact with the conductor 63 by rotating the screw cap to a predetermined position.

In this modified arrangement the light bulb is rendered inoperative by rotating the screw cap to move the extension 67 away from the conductor 64, and in the form of the invention previously described, the lamp bulb is rendered inoperative by inverting the position of the conductor 55 on the shaft 10, as is indicated in broken lines in Figure 4, to remove the tongue 57 out of contact with the screw cap 48.

Otherwise, the construction and operation of the modified form of the invention shown in Figures 5 and 6 is the same as that shown in Figures 1 to 4 inclusive, and described above.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

In a fishing apparatus including an electric signaling device, an elongated pole, and a tip-up signal spring slidably mounted on said pole and adapted to be held in a bowed position by a reel operated trigger and to assume a vertical position when released by said trigger, the improvement consisting in a combined support bracket embodying a first conductor formed from a piece of electrically conductive material shaped to include a loop portion embracing said pole, a strap portion extending from the loop portion and arranged longitudinally of said pole, aligned clips formed on the strap portion at spaced locations and each engaging said signaling device, and a platform projecting laterally from the strap portion to afford a supporting ledge for said signaling device against which a first contact element of the signaling device may engage, and a second conductor formed from a piece of electrically conductive material shaped to include a loop portion embracing said pole at a point spaced from and completely isolated from said first conductor, and a tongue extending from the second loop portion and arranged longitudinally of said pole and adapted to engage a second contact of said signaling device which is electrically insulated from said first contact of said signaling device, said tip-up spring having one end normally engaging said first conductor and having a portion intermediate its ends adapted to engage said second conductor when the tip-up spring is in the vertical position, said second conductor being movable longitudinally of said pole into and out of contact with the second signaling device contact.

References Cited in the file of this patent

UNITED STATES PATENTS

| Number | Name | Date |
|---|---|---|
| 522,352 | Poppowitsch | July 3, 1894 |
| 1,226,968 | Guenther | May 22, 1917 |
| 1,361,752 | Cross | Dec. 7, 1920 |
| 1,550,588 | Soldani | Aug. 18, 1925 |
| 1,796,460 | Jackson | Mar. 17, 1931 |
| 2,008,070 | Godman | July 16, 1935 |
| 2,029,707 | Dodelin | Feb. 4, 1936 |
| 2,032,537 | Kozikowski | Mar. 3, 1936 |
| 2,150,644 | Batcheller | Mar. 14, 1939 |
| 2,151,293 | Dross | Mar. 21, 1939 |
| 2,191,782 | Volane | Feb. 27, 1940 |
| 2,538,788 | Massino | Jan. 23, 1951 |
| 2,565,379 | Laurila | Aug. 21, 1951 |